July 20, 1954 E. BRUCE ET AL 2,684,405

TELEPHONE SELECTING SYSTEM EMPLOYING COMBINED SELECTING AND TALKING PATH GAS-DISCHARGE TUBE AND SELECTIVE DISCONNECTION

Filed Dec. 19, 1950 6 Sheets-Sheet 1

INVENTORS E. BRUCE
H. M. STRAUBE
BY William F. Simpson.
ATTORNEY

July 20, 1954 E. BRUCE ET AL 2,684,405

TELEPHONE SELECTING SYSTEM EMPLOYING COMBINED SELECTING AND TALKING PATH GAS-DISCHARGE TUBE AND SELECTIVE DISCONNECTION

Filed Dec. 19, 1950 6 Sheets-Sheet 2

INVENTORS E. BRUCE
H. M. STRAUBE
BY William F. Simpson
ATTORNEY

July 20, 1954 E. BRUCE ET AL 2,684,405

TELEPHONE SELECTING SYSTEM EMPLOYING COMBINED SELECTING AND TALKING PATH GAS-DISCHARGE TUBE AND SELECTIVE DISCONNECTION

Filed Dec. 19, 1950 6 Sheets-Sheet 3

INVENTORS E. BRUCE
H. M. STRAUBE
BY William F. Simpson.
ATTORNEY

July 20, 1954 E. BRUCE ET AL 2,684,405

TELEPHONE SELECTING SYSTEM EMPLOYING COMBINED SELECTING AND TALKING PATH GAS-DISCHARGE TUBE AND SELECTIVE DISCONNECTION

Filed Dec. 19, 1950 6 Sheets-Sheet 4

INVENTORS E. BRUCE
H.M. STRAUBE
BY
William F. Simpson
ATTORNEY

INVENTORS E. BRUCE
H. M. STRAUBE
BY William F. Simpson,
ATTORNEY

July 20, 1954

E. BRUCE ET AL 2,684,405

TELEPHONE SELECTING SYSTEM EMPLOYING COMBINED SELECTING AND TALKING PATH GAS-DISCHARGE TUBE AND SELECTIVE DISCONNECTION

Filed Dec. 19, 1950

6 Sheets-Sheet 6

INVENTORS E. BRUCE
H. M. STRAUBE
BY William F. Simpson.
ATTORNEY

Patented July 20, 1954

2,684,405

UNITED STATES PATENT OFFICE 2,684,405

TELEPHONE SELECTING SYSTEM EMPLOYING COMBINED SELECTING AND TALKING PATH GAS-DISCHARGE TUBE AND SELECTIVE DISCONNECTION

Edmond Bruce, Red Bank, and Harold M. Straube, Clifton, N. J., assignors to Bell Telephone Laboratories, Incorporated, New York, N. Y., a corporation of New York Application December 19, 1950, Serial No. 201,578

15 Claims. (Cl. 179—18)

This invention relates to a selective switching network for telephone switching systems employing a plurality of cold cathode gas discharge tubes.

The object of the present invention is to provide improved methods, circuits and apparatus for establishing connections through the telephone switching network in which the same cold cathode gas discharge tubes employed for selecting a path through the network are also employed to convey the intelligence or telephone voice currents through the network.

A feature of this invention relates to apparatus, circuits and methods of disconnecting or interrupting an established path through the system which comprises applying a predeteremined voltage condition to some one or more points in an established path usually either one or the other, or both ends of an established path through the switching network.

Another feature of the invention relates to circuits, apparatus and methods of suppressing surges of currents occurring upon the subscribers' lines and also those generated within the switching network so that these surges or extraneous currents do not materially interfere with the selecting or establishing of a path or with the conveyance of telephone currents over the established path and do not interfere with the disconnection or interruption of an established path through the switching network.

Another feature of the invention is the use of a gas discharge tube which has a small negative resistance characteristic in the operating region for the transmission of voice currents. This negative resistance is employed to cancel or compensate for some of the positive resistance of the transmission paths and thus reduces the transmission loss of the path.

Briefly, in accordance with this invention an improved telephone switching arrangement is provided which operates semi-automatically for establishing paths between a calling subscriber's station and a called subscriber's station under control of an operator. The operator responds to each call from a subscriber's line, which call is indicated by lighting a lamp, and the operator in responding connects her telephone set to the calling subscriber's line and determines the called subscriber's number. The operator then examines the calling and busy lamps of the called subscriber's line and if the line is idle the operator sets a plurality of manual switches first in accordance with the number of the called subscriber's station, then in accordance with the number or designation of an idle local transmission circuit and then the operator will operate a start or connect key and cause the called subscriber's line to be connected to the designated transmisison circuit. Thereafter, the operator will operate switches or keys or dials in accordance with the number or designation of the calling subscriber's station and a number designating the same transmission circuit, and again operate the start or connect switches or keys. Thereupon, the called subscriber's line is connected with the calling subscriber's line and the operator may operate a ringing key to ring the called subscriber's bell. At the termination of a call the operator upon observing a disconnect lamp will again operate switches in accordance with one or the other of the subscriber's numbers and then operate a disconnect key and thereafter the operator will operate the switches in accordance with the other subscriber's number and again operate the disconnect key, which operations cause the established path between the two subscribers to be interrupted and restored to normal.

Alternatively, the operator may disconnect the subscribers' lines by operating her keys in accordance with the numbers of the transmission circuits and thereafter operate the disconnect key which in turn causes each of the paths through the switching equipment from the transmission circuit to the subscriber's line to be interrupted and the circuits restored to their idle or normal condition.

The foregoing objects and features of this invention may readily be understood from the following description when read with reference to the attached drawings in which:

Figs. 1, 2, 3, and 4 show in detail a few exemplary circuits embodying the present invention;

Fig. 5 shows the manner in which Figs. 1, 2, 3, and 4 are positioned adjacent each other;

Fig. 9 shows the manner in which Figs. 7 and 8 are positioned adjacent each other.

Figures 1, 5, 9:
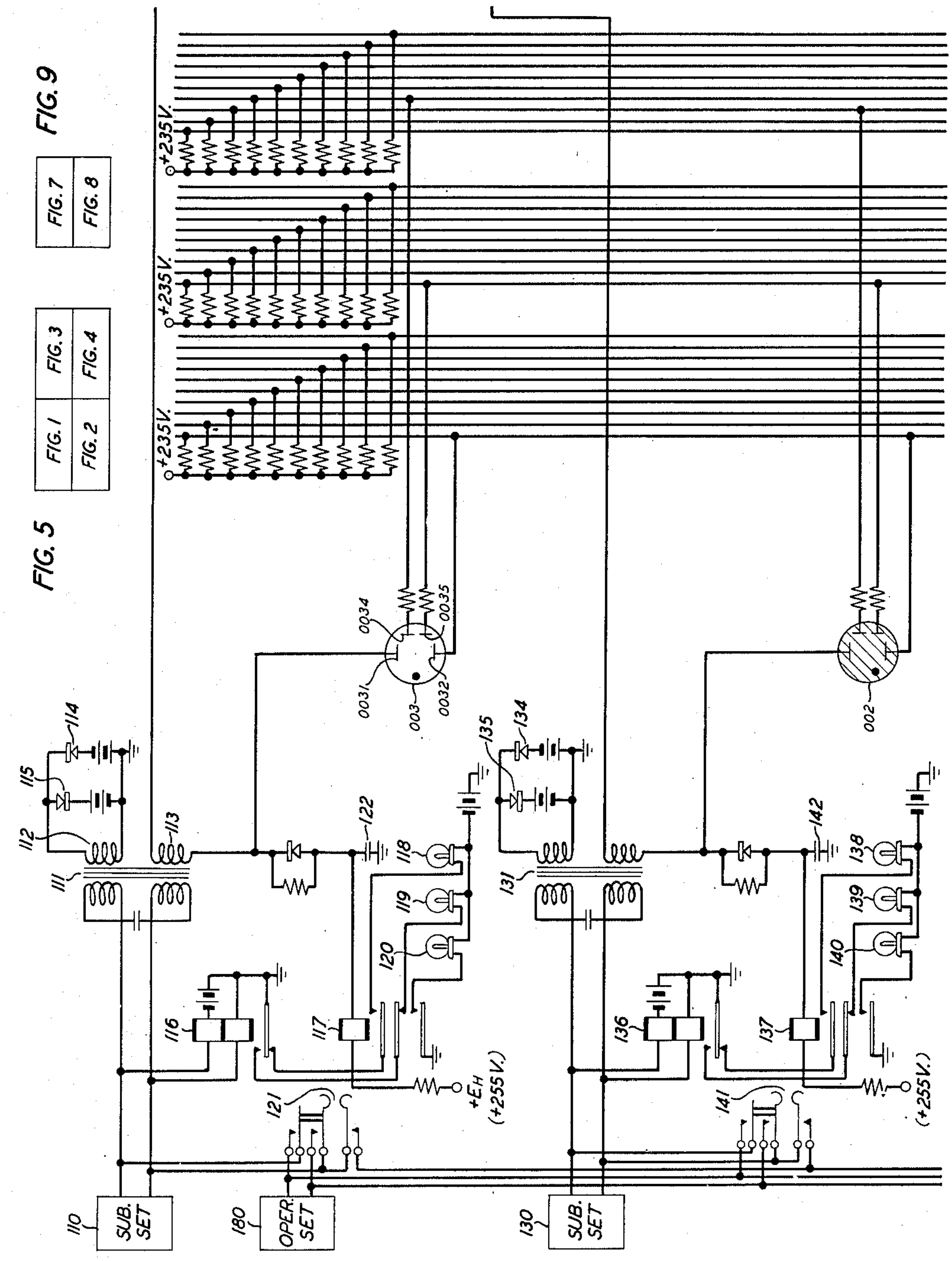
Figure 2:
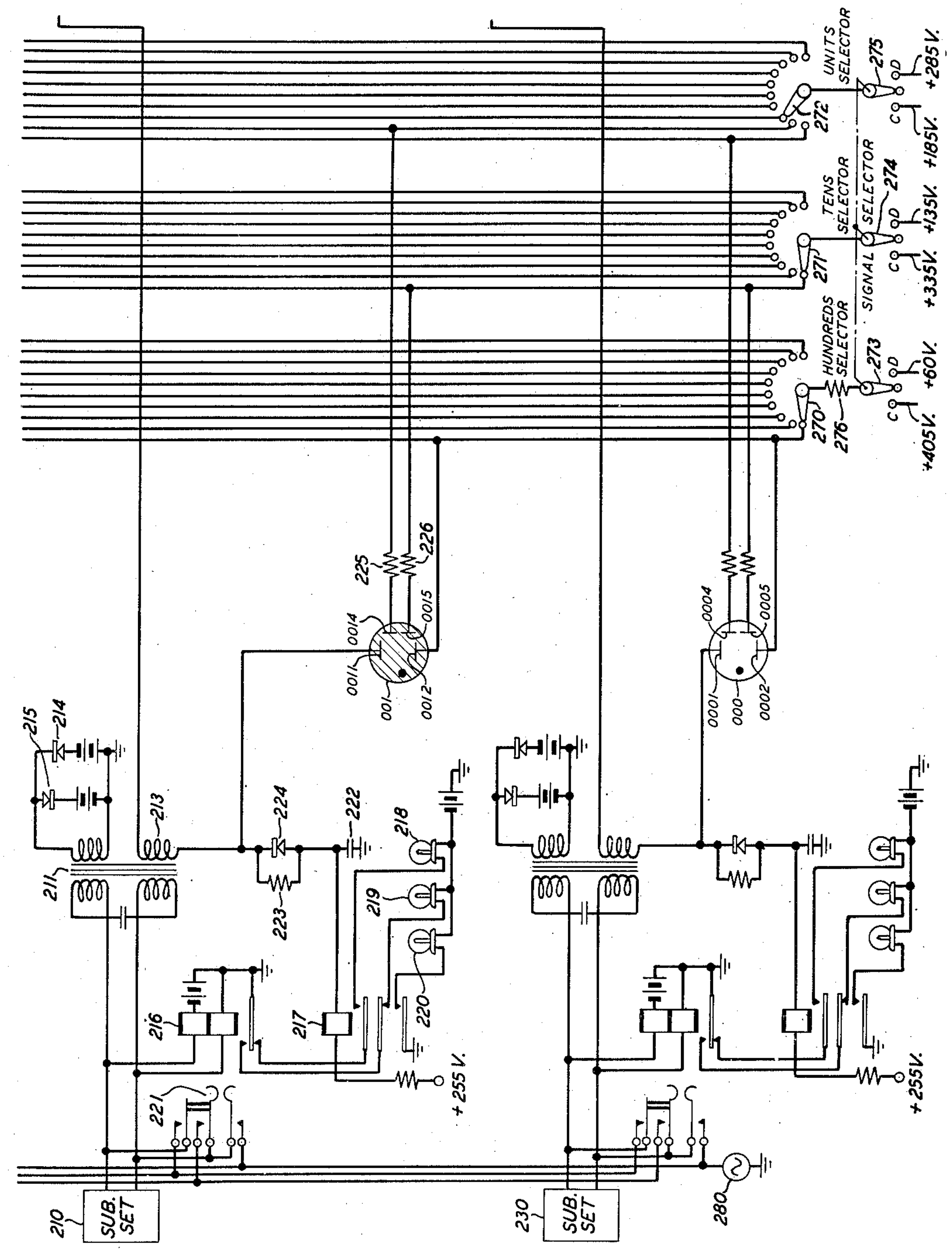

Figs. 1, 2, 3, and 4 when positioned adjacent one another as shown in Fig. 5, show the circuit details of representative lines and two common transmission circuits of an automatic telephone switching arrangement embodying the present invention. These circuits are representative of many more similar types of circuits, a subscriber's line circuit and related equipment being provided for each of the subscribers or each party line and sufficient transmission circuits being provided to permit a maximum simultaneous busy hour number of calls to be established through the system. The two transmission circuits shown are for intraoffice calls. However, similar circuits may be provided for interoffice calls when one end of such circuits terminates at one switching center, or central office, and the other end terminates at another office.

Each subscriber's line has connected to it a line relay such as 116 for the subscriber's station 110, a transformer 111 for transmitting voice currents and an operator's or supervisor's key 121. Key 121 may be operated from its normal position in one direction so that the upper set of contacts is closed, in which position the operator's position circuit and telephone set 180 are operatively associated with the subscriber's line. When the key 121 is operated in the other direction, the lower set of contacts is closed which causes ringing current to be applied to the subscriber's line. Each of the other subscriber's stations, such as 130, 210 and 230, is similarly provided with terminal equipment. In addition, each subscriber's line is provided with a group of supervisory lamps, such as 118, 119 and 120. Lamp 120 is a busy lamp and lights at all times during which the subscriber's line is busy and connected to another subscriber. Lamp 119 is a calling lamp and lights each time a subscriber initiates a call. Lamp 118 is a disconnect lamp and lights at the termination or abandonment of a call and indicates that the previously established connection from the subscriber's line should be interrupted and returned to normal. In addition, a line tube individual to each subscriber's line, such as 003 for the subscriber's station and line 110 and 002 for the subscriber's line and station 130, 001 for the subscriber's line and station 210, and 000 for the subscriber's station and line 230 are provided. These tubes are employed to selectively establish connections to the respective lines as will be described hereinafter.

Figure 3:
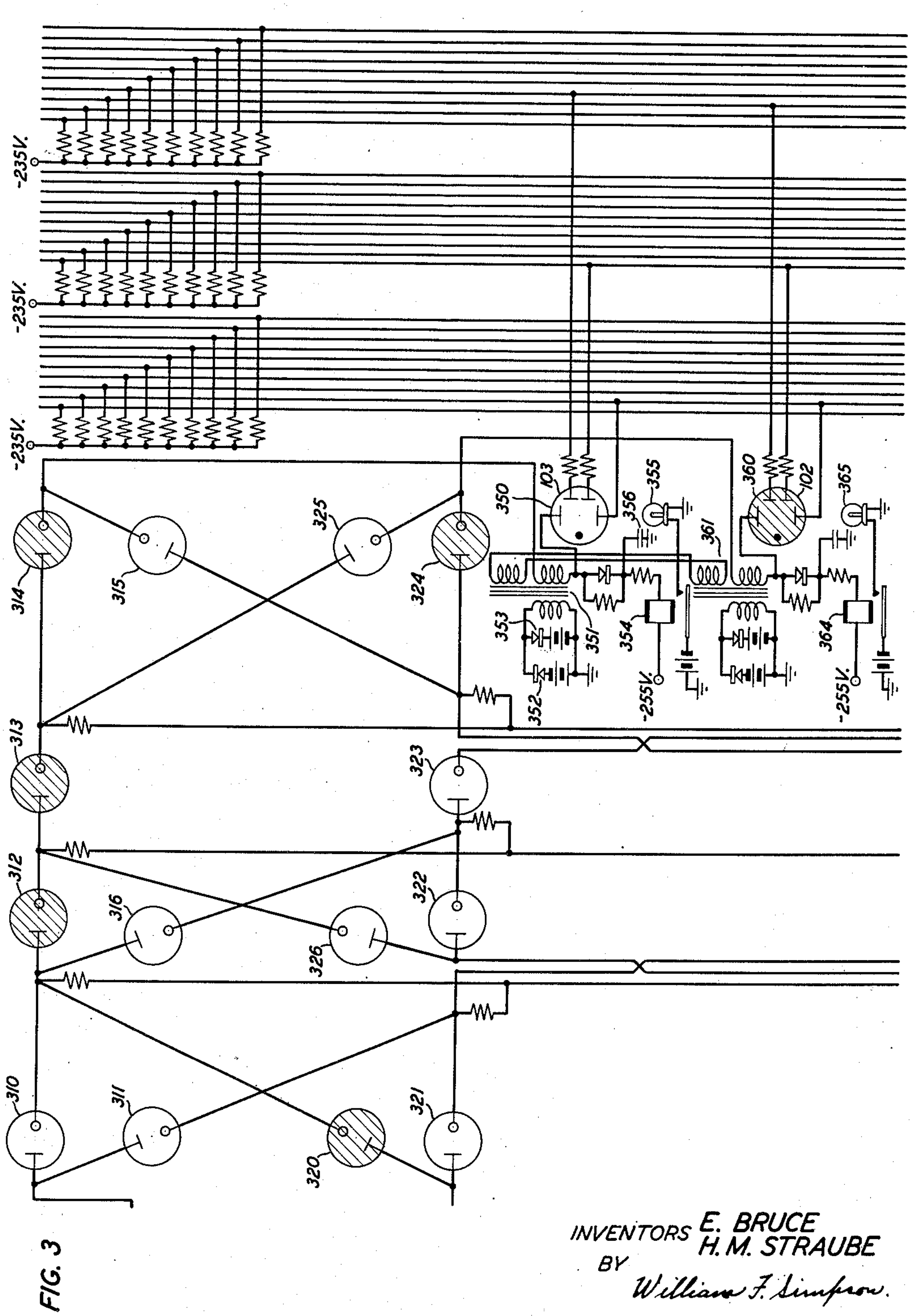
Figure 4:
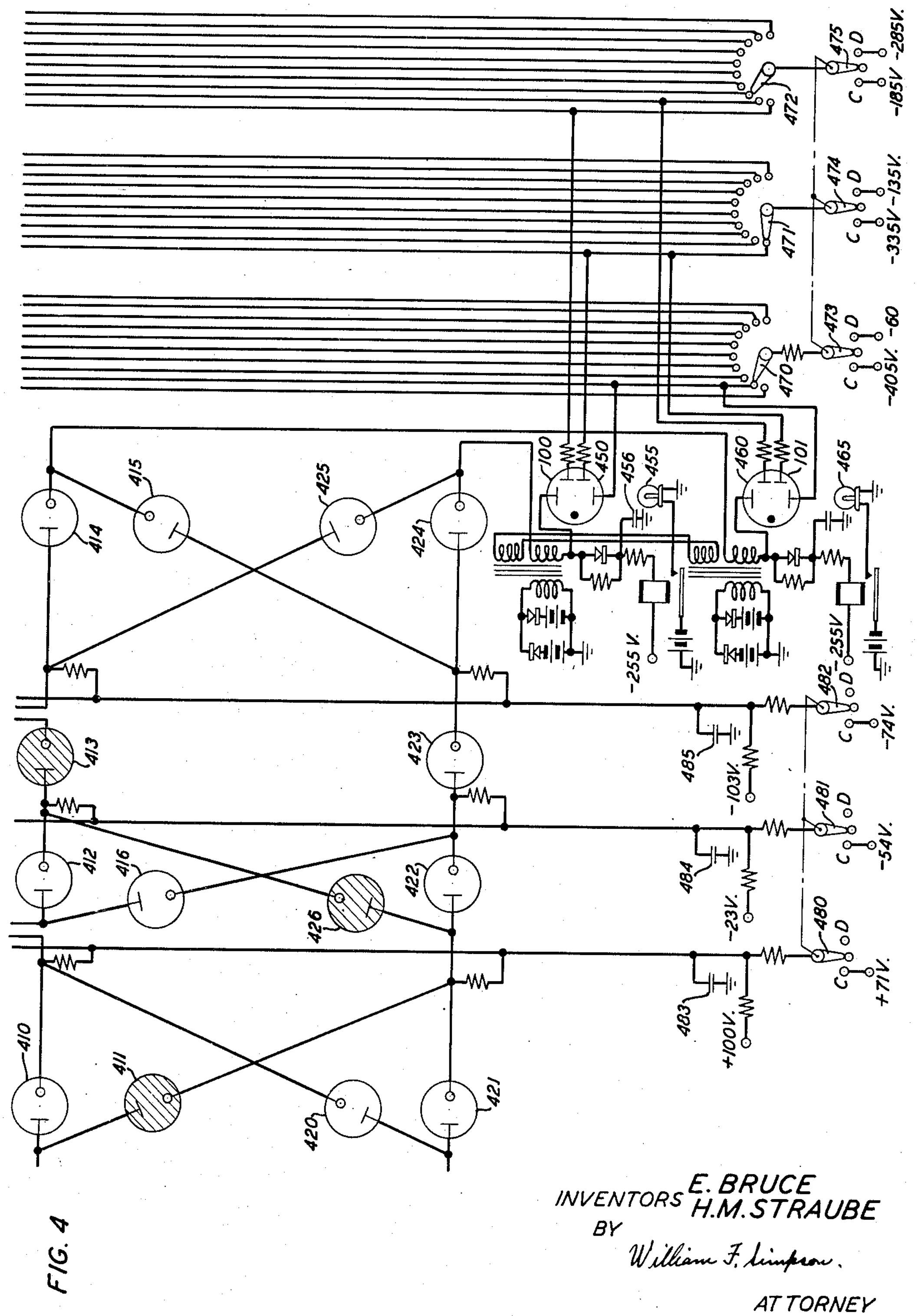

In addition, a common transmission circuit is shown in Fig. 3, employing tubes 350 and 360 for selectively establishing connections to this transmission circuit and transmission transformers 351 and 361 as well as related busy relays 354 and 364 and busy lamps 355 and 365. A similar transmission circuit is shown in Fig. 4. In addition, Figs. 3 and 4 show a gas conduction tube switching and transmission network comprising a plurality of two-element gas discharge tubes. The tubes shown in this network are merely representative of a large number of similar tubes employed to enable connections to be established between any two subscribers' lines terminating at the switching center represented in the drawing. As shown in Figs. 3 and 4, these tubes are arranged in four stages, the first stage on the left being frequently called a primary line switch stage, a second column being frequently referred to as a secondary line switch or line frame stage. The first column of tubes on the right is frequently referred to as a trunk primary frame or switch stage and the second column of tubes from the right is usually called secondary trunk switch or switch frame stage of tubes. In addition, three series of switches are shown across the bottom of Figs. 2 and 4. These switches are common to the operator's position 180 shown in Fig. 1 and are employed by the operator to establish and interrupt transmission paths through the system.

Assume for purposes of illustration that the subscriber at station 130 wishes to communicate with a subscriber at station 210, for example. The subscriber at station 130 will thereupon lift his receiver or handset which, in turn, actuates contacts in the subscriber's set in a well-known manner and completes a direct-current path between the two line conductors of a subscriber's line. As a result, current flows through both windings of relay 136 from the battery connected to its upper winding and over the subscriber's line circuit back to ground through the lower winding of this relay. Relay 136 thereupon operates and completes a circuit for lighting the calling lamp 139 from ground through the operated contacts of relay 136 and the center set of contacts, relay 137 to battery through the calling lamp 139.

The operator at the switching station upon observing the lighted lamp 139, operates the talking key 141 associated with this lamp to close its upper contacts, which key thereupon connects her position and telephone circuit to the subscriber's line extending to station 130. The operator will then inquire as to the number desired by the subscriber. The operator will then observe the calling and busy lamps of the called subscriber's line and, if the line is idle, these lamps will be extinguished whereupon the operator will operate switches 270, 271 and 272 in accordance with identity of the hundreds digit, tens digit and the units digit of the desired subscriber's line number.

It is assumed that the subscriber at station 130 wishes to communicate with the subscriber's station 210 whereupon the operator will observe both lamps 220 and 219. Assuming that the line to station 210 is idle, both lamps 220 and 219 will be out so the operator will set the switches 270, 271 and 272 in accordance with the number 001 which is assumed to be the directory number assigned to station 210. Next the operator will observe the common communication circuit busy lamps such as 355, 365, 455, 465, etc., and will select an idle circuit such as the one associated with the busy lamps 355 and 365, which lamps will be out when this circuit is idle. The operator will then operate keys 470, 471 and 472 in accordance with the number assigned this transmission circuit which is assumed to be 102 in the specific arrangement disclosed in Figs. 3 and 4. In other words, the operator will set 470, 471 and 472 in the position shown in the drawing. With the switches 270, 271 and 272 set in the position shown in the drawing in accordance with the number of the called subscriber's station and switches 470, 471 and 472 set in accordance with the number of an idle trunk circuit, as shown in the drawing, the operator will operate a start or connect key which comprises the switch elements 273, 274, 275, 473, 474, 475, 480, 481 and 482. These elements may be individually operated, or they may be operated in groups, or they may be all operated from one manually operated key or they may be all operated from one or more relays which, in turn, are simultaneously operated from a manually operated key which is operated by the operator at this time.

The operation of the switch elements 273, 274, 275 with the switches 270, 271 and 272 set in the position shown, causes discharges within the number of line tubes 000, 001, 002, 003, and so forth, which select the tube 001 and cause the main discharge to be initiated through only this tube set forth hereinafter. Likewise, the operation of the switch elements 473, 474 and 475 when the switches 470, 471 and 472 are set in the position shown in the drawing, causes discharges through the transmission circuit tubes such as 350, 450, and so forth, and selects one of these tubes, assumed to be tube 360, and causes a discharge to be initiated between the main electrodes of this tube only, as will be described hereinafter. The discharges through tubes 001 and 360 also apply discharge initiating conditions to two points in the switch network comprising the tubes serially inclusive 310 to 316, 320 to 326, 410 to 416 and 420 to 426, etc. The discharge potential is applied from tube 001 through a winding of the transmission coil 211, the inductance of which serves as a lock-out element and permits only one path to be established from the subscriber's line 210 to the transmission circuit employing tube 360 and transmission coil 361. The mode of operation of each of these elements in response to this voltage applied to the circuit will now be described in greater detail.

Each of the line tubes comprises four electrodes, two of which comprise starter electrodes and two of which comprise main discharge electrodes. In tube 001 the starter electrodes are designated 0014 and 0015, while the main electrodes are designated 0011 and 0012. These tubes are designed so that a discharge is initiated between the starter electrodes when the voltage between these electrodes is above approximately 140 volts. When once the discharge is initiated between these electrodes, the voltage between them falls to a lower sustaining voltage. Thereafter if and when the voltage between electrodes 0014 and 0012 exceeds approximately 207 volts the discharge transfers from control electrode 0015 to main electrode 0012 so that the substantial current flow is then only between electrodes 0012 and 0014. Thereafter, with 255 volts applied to the electrode 0011 the discharge transfers to the main gap of the tube between electrodes 0011 and 0012. However, for the voltages employed it is necessary to initiate or transfer the discharges within the tube in the above order, otherwise a discharge will not take place between the main electrodes. Similar types of tubes are described in greater detail in the following patents and application: 2,273,958, Holden, February 24, 1942; 2,372,175, Depp, April 10, 1945; 2,518,319, Holdaway, August 8, 1950; Serial No. 13,283, Depp, filed March 5, 1948.

The switch element 275 applies positive 185 volts to the starter electrode of all the tubes having 1 for the last or unit digit including element 0014 of tube 001, with units selector switch 272 set in the position as shown in the drawing as assumed above. With a full complement of 1000 tubes, the positive 185-volt source will be applied to the corresponding electrode of 100 tubes. Likewise, with the tens selector switch 271 set in the position shown in the drawing, as assumed above, and with the switch element 274 operated to the connect position, a voltage of positive 335 volts is applied to the other electrode of the control gap in 100 tubes including the tube element 0015. The voltage difference between these two voltages, namely, 150 volts, is above the breakdown voltage required to initiate a discharge between these elements, and a discharge is therefore initiated between these elements within tube 001. It is to be noted that a resistor is individual to and connected in series with each of the starter electrodes, thus preventing any lock-out action between discharges between the starting electrodes of the various tubes. Consequently, a discharge is similarly initiated within the other tubes which have these two elements connected to the same terminals of switches 271 and 272 as the corresponding elements of tube 001. If it is assumed that a tube is provided for each of the thousand possible lines of a three-digit system, as assumed in the arrangement shown in the drawing, then such a discharge will be initiated between the corresponding elements of nine other line tubes similar to tube 001, namely, 101, 201 and so forth. It is noted that again assuming a full complement of tubes, the 0 terminal of the hundreds selector switch 270 will extend to one hundred tubes. However, only one of these tubes will be one of the ten tubes having discharges across their control gaps at this time. Thus with switch 270 set in the position shown in the drawing and with switch element 273 operated to the connect position, a voltage of 405 volts is applied to the main electrode 0012 of tube 001 and ninety-nine other such tubes. Tube 001 is the only tube of the one hundred tubes having this voltage applied to its main electrode which also has a discharge current flowing between the control elements thereof. Consequently as previously and hereinafter described, this is the only tube having a discharge initiated between both main electrodes thereof.

The electrodes of the line tubes are arranged within the tube and voltages applied to them, as described above, are such that after a discharge flows between the control gap elements it is necessary that the discharge is transferred from between the electrodes 0014 and 0015 to between the electrodes 0012 and 0014. If such a discharge transfer does not occur within the tube, it is impossible for a discharge to be initiated between the main electrodes of any of the tubes. With 405 volts applied through resistor 276 to the main electrode 0012 and 335 volts applied through resistor 226 to the control gap electrode 0015 and 185 volts applied through resistor 225 to the electrode 0014, the discharge within the tube will transfer or be initiated between the electrodes 0014 and 0012. Thereupon the discharge will transfer or be initiated between electrodes 0012 and 0011 due to the positive 255 volts applied to the main electrode 0011 through the relay winding 217 and related circuits including condenser 222, resistor 223, etc.

As a result, the voltage applied to the junction between tubes 410 and 411 through the lower right-hand winding 213 of the transmission coil 211 of the subscriber's line 210 rises from 255 volts to approximately 305 volts.

The circuits on the transmission side operate in substantially the same manner as described in selecting tube 001. With the switches set as shown a discharge will be finally established between the main electrodes of tube 360. Here again a voltage difference applied between the starter electrodes is sufficient to initiate a discharge between all of the tubes connected to the bus bars to which switches 471 and 472 are connected. In the exemplary embodiment set forth herein, discharges would be initiated in at most ten tubes. It should be pointed out that with a full maximum number of tubes the switch contact 472 applies —185 volts to one starter electrode of at most one hundred tubes and that the switch 471 applies a voltage of —335 volts to the other starter electrode of one hundred other tubes and that ten tubes will be common to both groups of one hundred tubes thereby resulting in the initiation of a discharge through the starter gaps of these ten common tubes. At this time the voltages of the tube starter electrodes shift due to the voltage drops across the various resistors due to the tube current in the same manner as at the line tube. In one exemplary embodiment, a tube current of approximately ½ milliampere flows between the starter electrodes under which circumstance the voltages with respect to ground of the upper and lower starter electrodes become −197 volts and −297 volts, respectively, thus resulting in a starter gap voltage difference of 100 volts which is sufficient to maintain the discharge at a current value of ½ milliampere. These voltage conditions, of course, apply to all of the tubes having a discharge flowing through them at this time. The switch 470 will likewise apply −405 volts to the lower main electrode of one hundred different tubes, assuming the maximum number of tubes. Of these one hundred tubes only one will be common with the ten tubes having discharges initiated through them. Accordingly, only this one tube will experience the necessary and sufficient conditions for transfer of the discharge from the lower starter electrode to the lower main electrode. Likewise, with a suitably chosen low value of resistance 276 the new current flow from the upper starter electrode to the lower main electrode in this tube will rise to about 5 milliamperes which value, in combination with the −255 volts already applied to the upper main electrode, results in an additional transfer of the discharge from the upper starter electrode to the upper main electrode. The resultant glow discharge which is then substantially between the upper and lower main electrodes provides a conduction path such that the voltage of the upper main electrode differs from the voltage of the lower main electrode by the inherent sustaining voltage of the tube. In the exemplary embodiment, the sustaining voltage under these conditions is approximately 100 volts so that the upper electrode of the selected tube therefore seeks a voltage of approximately −305 volts with respect to ground. This voltage is similar and complementary to the +305 volts which was shown to be achieved on the upper electrode 0011 of tube 001 in the previous discussion.

Thus the tubes 001 and 360 select the two terminal points of the gas conduction tube switching network between which it is desired to establish a connection. The discharges through these tubes apply a high voltage to these two terminal points, which voltages are employed to successively initiate discharges through various tubes and ultimately select a single path from the first selected point to the second one of these tubes. Thereafter the selected path is maintained until interrupted or the discharges extinguished as will be described hereinafter.

Figure 6:
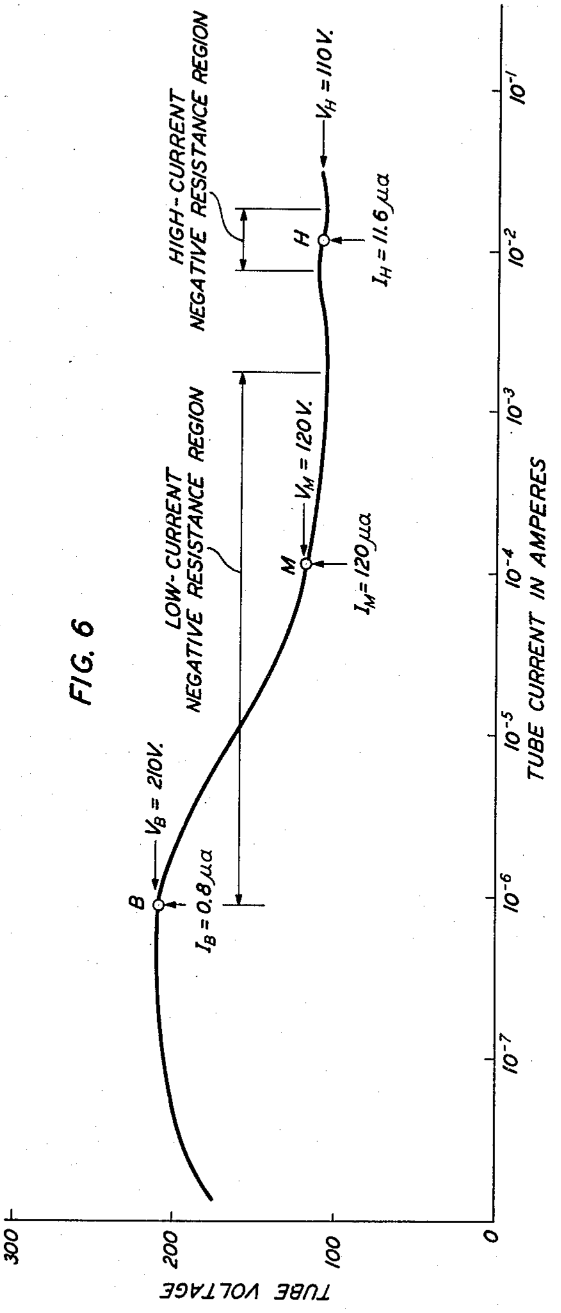
Fig. 6 shows a curve of voltage-current relation of a suitable gas discharge tube.

The diodes used in an exemplary switching network have a characteristic illustrated in Fig. 6 which shows the relationship between the voltage across the tube and the current through it. From low values of current up to about one microampere the tube has a positive resistance characteristic. As the current through the tube below this value rises, the voltage across the tube also rises. This region is shown to the left of B in Fig. 6. When some critical point, such as illustrated by point B, is passed, the voltage across the tube falls as the current through the tube increases. Such a region is frequently called a negative resistance region and commonly occurs in cold cathode discharge tubes between currents of about one microampere and about one milliampere as shown in Fig. 6. In accordance with certain types of tubes, such as disclosed in United States Patent 2,507,696, granted to Depp, May 16, 1950, after some such current as one milliampere is reached, the voltage across the tube again starts to increase as current further increases thus causing the tube to have a positive resistance in this region of its operating characteristics. Certain types of tubes such as disclosed in a patent application of Townsend, Serial No. 169,121, filed June 6, 1950, have another voltage maximum and a falling or negative resistance characteristic throughout the relatively high current region between about 5 milliamperes and about 20 milliamperes. A central point in such a region is indicated to occur at point H in Fig. 6.

With both types of tubes it is to be understood, of course, that in order to secure satisfactory working ranges and limits, it is necessary first that the breakdown and sustaining voltages of the individual tubes be relatively far apart. In other words, it is desirable that the voltage required to initiate a discharge through the tube should be appreciably greater than the voltage across the tube required to maintain a substantial discharge therethrough. In the second place, it is highly desirable that the operating characteristics of each of the several tubes be as nearly as possible like the operating characteristics of all the other tubes of the particular type. It is also desirable that the battery variations and variations in the values of the other circuit elements and parameters be made as small as practical in order to secure the greatest of operating margins.

With the switch element 482 connected to the connect or C terminal, negative 74 volts is applied to the junctions between all of the tubes of the first two columns on the right instead of −103 volts. The −74 volts, together with the −305 volts at the upper main electrode of tube 360, is sufficient to initiate a current flow through each of the tubes, such as tubes 324 and 325 connected to the upper main electrode of tube 360 through the winding of coil 361 and idle junction points between the first and second columns of tubes on the right. However the resistance in series with each of these paths, particularly the resistance connecting the junction point to the −74 volts, is sufficiently high so that a current corresponding to the point M in Fig. 6 is not exceeded in any of the tubes. There is one of these resistors individual to each of the tubes and since these resistors are of a high value, no lock-out phenomenon occurs and a discharge will be initiated through all the tubes extending to idle junctions.

If, however, some one of the tubes is connected to a busy tube in the second column, insufficient voltage is applied across this tube to initiate a discharge through it as will be described hereinafter.

In a similar manner, the application of approximately 305 volts to the common junction between tubes 410 and 411 causes a discharge to be initiated through these tubes to the +71 volts through the current limiting resistors since switch 480 is now connected to the +71-volt source as indicated in Fig. 4. When a discharge current starts to flow through these tubes, 410 and 411 for example, the voltage drop across these tubes falls to a sustaining value which is approximately 120 volts, point M, Fig. 6, with the result that an increase in voltage is now applied to the tubes of the second column which are connected to tubes 410 and 411 and such other similar tubes of the first column as may have discharges in them. In other words, these junction points between the first and second columns of the tubes now rise to approximately 305—120 or 185 volts positive so that discharges will again be initiated through the tubes in the second column such as tubes 322, 326, 422 and 426 which are idle and extend to idle tubes in the third column. The current limiting resistors between the tubes of the second and third columns again limit the current flowing through the tubes in the first and second columns on the left so that the tubes operate near a point corresponding to point M in Fig. 6. In each case the current limiting resistor is individual to each of the tubes so discharges will be initiated through all the possible idle paths since the common lock-out phenomenon can only take place in circuits having little or no resistance or impedance individual to the respective tubes. For lock-out phenomenon to occur the impedance of the circuit external to the tubes must be substantially all common to the tubes among which the lock-out is desired.

Thus all of the idle paths from tube 001 to the third column from the left of the switching tubes have been marked by discharges through the tubes. Likewise, all of the idle paths from tube 360 have been marked through the fourth or right-hand column to idle tubes of the third column.

Although any stage or group of the tubes may be made to operate as the final selecting stage, under the assumed voltage conditions applied, the third column is employed as a final selecting stage and is employed to select one of many possible paths between the two terminal points such as tubes 001 and 360. At this time the voltage applied to the tubes of the third column will be approximately (—305)—(—120) or —185 volts negative on the right-hand electrode or terminal and approximately 305—120—120 or 65 volts positive on the left-hand electrode or terminal which is a voltage difference of about 250 volts which voltage is sufficient to initiate discharges through idle tubes of the third column which are connectable through tubes of the other columns to the terminal tubes 001 and 360. As shown in the drawing, the discharge initiating voltages are applied to two tubes in the third column, i. e., tubes 313 and 413. The path through each of these tubes extends through three other tubes. Thus one path extends from tube 001 through tubes 410, 326, 313, and 325 to tube 360 and another path from tube 001 through tubes 411, 426, 413 and 324 to tube 360. However, the circuits of all of these tubes now extend through the inductance of the lower right-hand windings of coils 211 and 361. This inductance and related circuit impedance is substantially all of the impedance in series with these tubes and it is common to all of them so that it operates as a lock-out impedance element under which circumstance when a discharge starts to flow through one of the tubes of the third column, assumed to be tube 413 for purposes of illustration, the voltage drop across the inductance of the lower right-hand winding of coil 211 causes the voltage at this point to fall to such a value that discharges are not initiated through any of the other tubes of the third column.

Inasmuch as the total circuit impedance is now much lower, the current through the selected path comprising tubes 411, 426, 413 and 324 rises to a much higher value somewhat greater than the value corresponding to point H on the curve of Fig. 6. At this time the voltade drop across each of the tubes is approximately 110 volts.

Inasmuch as the connections at both ends, namely, the right-hand side of tube 324 and the left-hand side of tube 411 are symmetrical, the junction point between tubes 426 and 413 will be at substantially ground potential and 110 volts will exist across each of the conducting tubes with the result that the current through the various resistors at the two ends will increase to a value required to produce the above described voltages.

With the above described voltages of approximately 110 volts across each of the tubes 411, 426, 413 and 324, these tubes will test busy to other tubes which may attempt to establish a path through the system because the other tubes extending to the junction points between these tubes will have insufficient voltage applied to them to mark paths through these other tubes to the busy path. Thus, the established path is not disturbed or interferred with by later attempts to establish other paths through the switching network. For example, with 110 volts between the junctions between tubes 411 and 426 and assuming that approximately 305 volts is applied to the junction point between tubes 420 and 421 the voltage drop across tube 421 will be 305—110 or 195 instead of 305—71 or 234, had the path through tubes 426 and 422 been idle. The tube 421 will have a discharge initiated through it with 234 volts across it but as shown in Fig. 6 will not have a discharge initiated across it with 195 volts across it since it requires at least approximately 210 volts to initiate a discharge through this tube. Likewise, the voltage drop across tube 324 is 110 volts negative to the voltage between tubes 413 and 324 and is insufficient to initiate a marking discharge through tube 315. The same or similar conditions exist between all of the other possible alternative paths to the path comprising tubes 411, 426, 413, and 324 with the result that this path and the individual sections of tubes thereof in effect test busy and for such potentials applied to them that other tubes connected to this path will not have discharges initiated through them so long as the path through tubes 411, 426, 413 and 324 is established.

The operator after operating the switch elements 273, 274, 275, 473, 474, 475, 480, 481 and 482 to the left-hand or connect position as described above in selecting a path between tubes 001 and 350 will restore these switch elements to their middle or neutral position. The voltages applied to the control electrodes and the lower electrode of tubes 001 and 360 are restored to approximately ±235 volts, respectively, due to the normal biasing battery applied to these electrodes shown at the top right-hand portion of the respective Figs. 1 and 3. As described above, the voltage of the upper electrode of these tubes is substantially ±220 volts, respectively, with the result that the discharges through tubes 001 and 360 are interrupted and the tubes become non-conducting. Current flowing through these tubes is then replaced by current flowing through relays 217 and 364.

Either upon the selection of one of the paths such as the path comprising tubes 411, 426, 413 and 324 or upon the restoration of the above switch elements to normal and the interruption of the discharge through tubes 001 and 360 the respective relays 217 and 364 operate.

The operation of relay 364 operates a busy lamp 365 to indicate to the operator that the transmission circuit associated with tube 360 and designated 102 is busy.

Likewise, the operation of relay 217 completes a circuit for lighting the busy lamp 220 and interrupts the operating circuit for light 219 which light then becomes extinguished.

The selection of a path through the switching network by the initiation of the discharge through tube 413 which path comprises tubes 411, 426, 413 and 324 together with the interruption of the discharges through tubes 001 and 360 and the restoring of the switch elements 480, 481 and 482 to their normal or neutral position reduces the voltages applied to the selecting tubes such as 410, 422, 322, 326, and 325 so that the voltages now applied to these tubes together with the high resistance in series with them causes the marking discharges through these tubes to be extinguished thus restoring the other partial paths not selected to their idle or normal condition wherein the elements thereof may be employed to establish other connections. Had tube 313 become selected instead of tube 413 as assumed above, then the transmission path would extend through tubes 410, 326, 313, 423, and 325 and upon the restoration of the start key the marked tubes 411, 422, 426, and 324 would be restored to normal in the manner set forth above.

The interruption of the discharges through tubes 001 and 360 merely causes the current flowing through tubes 411, 426, 413, and 324 to be reduced. At this time the values of the resistors and resistances of the relays 217 and 364 are chosen so that the total current flowing through the selected tubes and paths is approximately 11½ milliamperes as indicated by point H in Fig. 6. Thereafter, current conditions through the tubes 411, 426, 413, and 324 remain substantially the same during the time the connection is established.

The operator will next operate the switches 470, 471, and 472 in accordance with the number assigned to the calling station 130 which is assumed to be 002. The operator will also operate switches 470, 471, and 472 in accordance with the number assigned to the other end of the transmission circuit, which in the exemplary embodiment set forth herein is assumed to be 103.

The operator will then again operate the switch elements 273, 274, 275, 473, 474, 475, 480, 481, and 482 to the connect position which causes discharges to be initiated through tube 002 and tube 350 to mark the two ends of a path through the switching network which marking potentials then cause idle tubes to break down and conduct as described above to select a transmission path from the subscriber's station through a second set of four tubes to a transmission circuit comprising coils 351 and 361.

For the purpose of illustration it is assumed that this path comprises tubes 320, 312, 313 and 314. Upon the selection of this path the potentials between the various tubes assume the values described above so that the path tests busy at each of the junctions between the various tubes thus preventing other tubes connected to these tubes from having discharges initiated through them upon subsequent attempts to establish paths through the switching network. Thereafter, the operator will restore the start key to its neutral position whereupon the discharges through tubes 002 and 350 are interrupted and the current flowing through tubes 320, 312, 313 and 314 is established at about 11½ milliamperes. Likewise, relays 137 and 354 operate causing the busy lamps 140, 220, 218, and 355 to light and calling lamp 139 to become extinguished. The operator upon noting the lighting and extinguishing of these lights will then operate the ringing key 221 to its ringing position and apply ringing current to the called subscriber's line 210.

When the called subscriber answers, relay 216 operates and interrupts the circuits of the answering disconnect lamp 218 thus indicating to the operator that the called party has answered. Thereupon the operator will cease to operate the ringing key 221 and will attempt to establish other paths through the switching equipment in response to other calls.

The two subscribers are now in direct communication with each other and the relay windings 136 supply talking battery to the subscriber station 130 and relay 216 supplying talking battery to the subscriber's station 210. The voice currents transmitted from station 130 are transmitted through the subscriber's line and through the transmission coil 131 and then through the lower right-hand winding thereof through the tubes 320, 312, 313, and 314, and then through coils 351 and 361 and then through tubes 324, 413, 426, and 411 to the lower left-hand winding of the repeat coil 211 and through this repeat coil and over the subscriber's line to station 210. The voice frequency currents from station 210 are transmitted over this same path in the reverse direction to the subscriber's station 130 and thus provide a complete two-way communication path between the two subscribers' stations.

As illustrated in Fig. 6 the operating point of the tubes of the switching network at this time are centered about point H of Fig. 6 in which region the tubes have a negative resistance component with the result that this negative resistance will in part cancel other resistances of the circuit thus providing a small insertion gain for the voice current signal level as it passes through the switching network. It should be noted that the transmission path from the lower side of the winding 213 is through resistance 223 which shunts the diode 224 and through the condenser 222 to ground. The impedance of this path is sufficiently low so that only a small transmission loss is introduced into the circuit due to these elements. It should also be noted that the transformers 131 and 211 as well as the coils 351 and 361 have an additional winding wound thereon connected to a pair of diodes or varistors. This additional winding is the upper right-hand winding of coil 211 and the left-hand winding of the coil 351. The diodes connected to this winding such as tubes 215 and 214 are oppositely connected to the biasing voltage and to the windings of the repeat coil such as 211, 351, 361 and 133 in the exemplary embodiment set forth herein in detail. The two diodes are thus biased to operate as limiters for suppressing transient surges in the switching network which exceed the bias limits provided for each of these rectifiers. The rectifiers and relating winding and circuit thus eliminate and reduce the effect of switching circuits upon the established voice frequency path and in addition these rectifiers serve to suppress any transients coming from the subscriber's station or at least over the subscriber's line which is of sufficient magnitude to possibly interfere with the operation of the switching network.

Diode 224 is connected in series with the winding of relay 217 and is poled so as to oppose the flow of current from the electrode 0011 of tube 001 when this electrode is higher than +255 volts. When the voltage of tube 001 is higher than +255 the diode 224 reduces the current from the upper electrode of tube 001 through relay 217 to the +255-volt supply to a small value determined largely by the value of resistor 223. Thus the current through the tube 001 at this time is substantially all available to control the establishment of a path through the switching tubes. At all other times when the upper electrode of tube 001 is not above +255 volts; i. e., when a discharge is not flowing to the upper electrode of tube 001; during disconnect; etc., the diode 224 does not materially affect or interfere with the flow of current through relay 217 and the switching tubes.

At the completion of the call each of the subscribers will hang up and interrupt current flowing through the respective relays 136 and 216 causing these relays to release. Relay 136 in releasing completes a circuit for lighting the disconnect lamp 138 and relay 216 in releasing completes a circuit for lighting the disconnect lamp 218. The busy lamps, however, remain lighted at this time. The operator upon noting the lighted disconnect lamps 138 and 218 will set her selector switches 270, 271 and 272 in accordance with the numbers of one of these lines assuming, for example, 002 for line 130. Thereupon the operator will operate the start key to its disconnect or right-hand position where discharges are selectively established through the various elements of the tubes in a manner similar to that described above with respect to the establishment of a connection. In other words, tube 002 will be selected by having a discharge initiated across its main discharge electrodes. This tube is the only tube of all of the tubes associated with lines which have such a discharge initiated within it in a manner similar to that described above. However, at this time the discharge current is flowing in the opposite direction through the main gap to that described above with the result that the voltage of the upper end of this tube is reduced to a relatively low value below the sustaining value of the switching network tubes which causes the discharges through the series of tubes 320, 312, 313 and 314 to be interrupted and this group of tubes restored to its normal or idle condition. The operator will then release the start key and reset her selector switches 270, 271 and 272 in accordance with the number assigned to line 210. She will thereafter again operate the start key to disconnect which again reduces the voltage applied to the selected path comprising tubes 411, 426, 413 and 314 below the value required to maintain discharges through these tubes with the result that these discharges are interrupted and a path restored to its normal or idle condition.

In disconnecting, the operator may, if she so desires, operate the switches 470, 471 and 472 in accordance with the designations of the trunk circuit to which the subscriber is connected in addition to the switches 270, 271 and 272 prior to operating the key or switch elements 273, 274, 275, 473, 474, 475, 480, 481 and 482 to the disconnect position. Under these circumstances the disconnect voltage condition is applied to both ends of the path through the switching system and causes the tubes passing current to be restored to their normal condition. If the operator so desires and can recall the trunks associated with the various subscribers she may operate trunk switches 470, 471 and 472 instead of the subscribers' line switches 270, 271 and 272 and thereafter operate the common switches including 473, 474 and 475 to the disconnect position. Under these circumstances the discharge will be initiated through corresponding tubes 350 or 360 which discharge will apply a potential or voltage to the switching network which causes the discharges through the previously established path to the tubes 350 or 360 to be interrupted as described above.

Thereafter the operator may operate the various keys and switches in the manner described above and establish other communication paths through the switching system as may be required.

Figure 8:
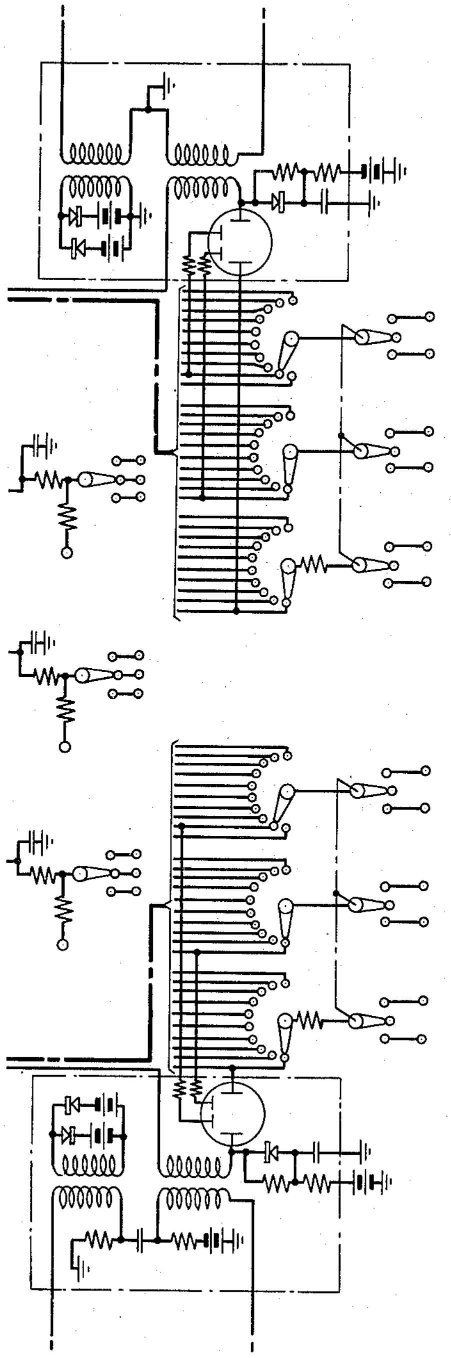
Figs. 7 and 8 show in outline form various elements of a more comprehensive switching network in accordance with the present invention.
Figure 7:
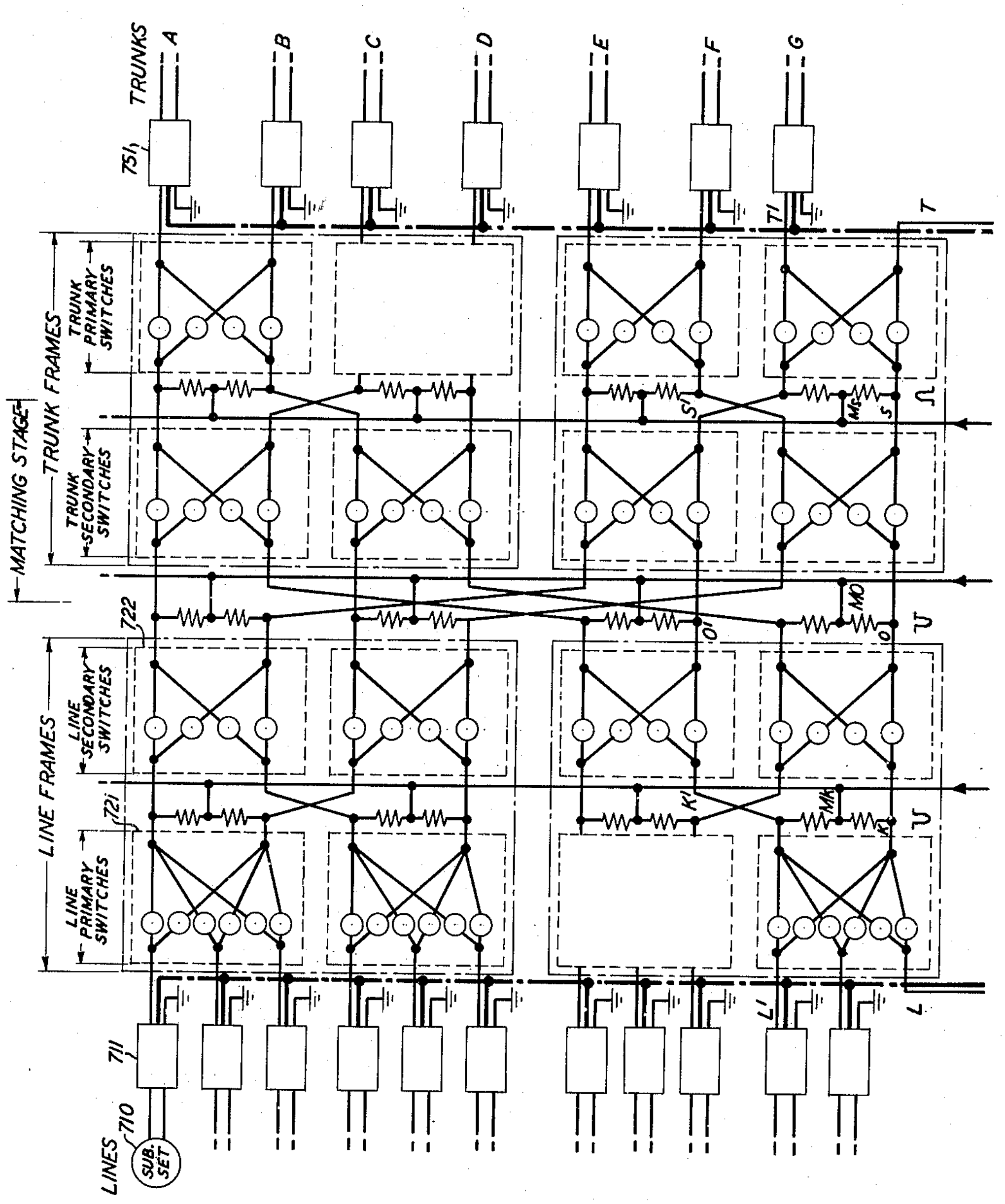

While the manner of operating the system has been described above with reference to four subscribers' lines and two intraoffice trunks, the same principles and mode of operation apply to large comprehensive telephone switching arrangements. Figs. 7 and 8 show in outline form the various elements of such a switching system. In these figures twelve subscribers' lines and eight trunk circuit terminations are shown. The subscribers' stations are represented by circles 710 and the subscriber line terminations by the rectangles 711. The rectangles include the line and busy relays as well as the subscribers' line keys and various elements described above with reference to the subscriber's station 110. The trunk circuits are represented by rectangles 751 and these trunk circuits likewise include the various busy relays, lamps, repeat coils, rectifiers and similar equipment described above. As shown in Fig. 7 the switching network comprises four stages of gas-filled tubes of the type described above. Two stages are frequently mounted on line frames and the other two stages on trunk frames as indicated in Fig. 7. The two stages mounted on the line frames are frequently called a primary line group or switches and a secondary line group or switches. Thus each of the primary line groups of tubes such as 721 is shown to comprise six tubes in Fig. 7. Likewise, the secondary line switches or groups, such as 722, are shown to comprise four tubes. It is to be understood, however, that in a large switching center both of these groups would comprise many more tubes. Frequently ten primary line switches or groups are associated with ten secondary line switches or groups and each secondary line switch or group will be provided with ten outlets or links to the trunk secondary switches. Likewise, each of the secondary switches will be provided with ten incoming circuits, one from each of the primary line switches. Under these circumstances each of the secondary stages will be provided with one hundred or more tubes. The primary line switches would normally be arranged to provide service for a larger group of subscribers' lines than three shown in Fig. 7. The primary line switches would therefore comprise a number of tubes equal to the product of the number of subscribers' lines connected to the switch and the number of outlets from the switch.

In addition, the primary and secondary groups of tubes or switches will be provided with a suitable number of tubes depending upon the number of trunks and the number of calls to the trunks.

The control arrangement shown in Fig. 8 cooperates with the line circuits, trunk circuits and switching network in the same manner as described above with reference to Figs. 1, 2, 3 and 4. Thus in the switching network shown in Figs. 7 and 8, discharges are initiated through the tubes of the various stages in succession in the manner described above. In addition, the tubes extending from an idle path to a busy path are prevented from having discharges initiated through them by the potential conditions or voltages of the various junction points of the busy paths in the manner described above. Likewise, numerous paths will extend through the switching network between a line circuit and a trunk circuit and these paths are selected by means of the lock-out characteristics of the tubes and related lock-out impedance elements connected in the circuit in the manner described above.

The leads extending to the junction points between the various stages in the switching network have various potentials normally applied to them as illustrated in Figs. 4 and 8 and when it is desired to establish a path through the system the voltage applied to these leads is changed. Then after the establishment of the path the voltage applied to these points is again restored to its normal condition. In order to prevent interference with established circuits due to switching surges and transients arising from changes in these voltages, condensers 483, 484 and 485 are connected to the conductors extending to these junction points. These condensers together with the resistors connected to these conductors have a time constant sufficiently long to suppress at least the major portion of the voltage surges or changes applying to these conductors and thus greatly reduce the noise and interfering currents induced into the established transmission paths incident to establishing another path through the switching system.

It is to be understood that the above-described arrangements are illustrative of the application of the principles of the invention. Numerous other arrangements may be devised by those skilled in the art without departing from the spirit and scope of the invention.

What is claimed is:

1. In a telephone system, a set of line talking paths, a set of trunk talking paths, a network for establishing interconnecting alternating-current transmission paths selectively between any one of said line paths and any one of said trunk paths, said network comprising (1) an array of electrically enterconnected gaseous tubes having each an anode and a cathode and being of the type which begin to conduct on an applied voltage of definite direction and value and remain conducting with a considerably smaller applied voltage across their respective anodes and cathodes, (2) resistors connected to electrodes of said tubes, and (3) voltage sources, means whereby each of said transmission paths is established through a plurality of said tubes in series, said voltage sources each having one terminus connected to a terminal of said resistors the other terminal of which resistor is connected to an electrode of a plurality of said tubes and each of said voltage sources having its other terminus connected to a common ground for the whole said network.

2. A combination according to the foregoing wherein switching means electrically interconnected with said line paths and with said trunk paths operable to select a line and a trunk is provided and wherein there is also provided a set of switches electrically interconnected with said tubes operable simultaneously to apply to a chain of said tubes between said selected line and trunk the necessary voltage to each tube member of the chain to cause it to conduct.

3. A combination according to claim 2 in combination with means including a set of switches electrically interconnected with said tubes operable simultaneously to lower the voltages of a set of said tubes in an established path below the voltage required to maintain said tubes conducting whereby they become extinguished.

4. A system as per claim 1 having power limiters electrically connected in shunt across the paths through the network to limit the voltage variations applied from the lines and trunks to a value which is a fraction of the difference between the applied voltage necessary to cause said tubes to begin to conduct and that at which they become extinguished.

5. In a telephone switching system in combination, a plurality of telephone lines, a switching network interconnecting said lines comprising a plurality of electrically interconnected gas-discharge tubes and including a selectable terminal for each of said lines electrically interconnected with said tubes, means for applying discharge initiating potentials to selectable terminals in said network, means interconnectable with said terminals for selecting individual ones of said selectable terminals means including said gas-discharge tubes for selecting and establishing a path between said terminals through a plurality of said gas-discharge tubes in series, means for applying discharge maintaining voltages to said selectable terminals and apparatus for superimposing upon said discharge maintained voltages varying voltages representing communication signals for transmission over said path comprising said tubes having discharges maintained therein.

6. In a telephone switching system in combination, a plurality of telephone lines, a switching network interconnecting said lines comprising a plurality of selectable terminals and a plurality of electrically interconnected gas-discharge tubes interconnected electrically with said selectable terminals, means for applying discharge initiating potentials to selectable terminals in said network, means including said gas-discharge tubes responsive to said potentials for selecting and establishing a path between said terminals through a plurality of said gas-discharge tubes in series, means for applying discharge maintaining voltages to said selectable terminals and apparatus for superimposing upon said discharge maintaining voltages varying voltages representing communication signals for transmission over said path comprising said tubes having discharges maintained therein, discharge interrupting voltage to one of said other apparatus including means for applying terminals for extinguishing discharges in tubes providing a path to said terminal.

7. In a telephone switching system in combination, a plurality of telephone lines, a switching network interconnecting said lines comprising a selectable terminal individual to each of said lines and a plurality of electrically interconnected gas-discharge tubes, means electrically interconnected with said terminals for selecting individual ones of said selectable terminals and applying discharge initiating potentials to said selectable terminals in said network, means including said gas-discharge tubes for selecting and establishing a path between said terminals through a plurality of said gas-discharge tubes in tandem, means for applying discharge maintaining voltages to said selectable terminals and apparatus for superimposing upon said discharge maintaining voltages varying voltages representing communication signals for transmission over said path comprising said tubes having discharges maintained therein, surge suppressing means individual to and connected to each of said lines for suppressing surges arising on establishing paths through said network and for suppressing surges arising upon said lines.

8. In a telephone switching system in accordance with claim 5, characterized in that impedance means is included in said means for applying discharge maintaining voltages to said selectable terminals for operating said gas-discharge tubes in a high current negative slope region on the voltage-current characteristic to provide insertion gain to voice frequency currents transmitted through them.

9. In a telephone system a plurality of telephone lines, a plurality of trunk circuits, switching network for selectively interconnecting any of said lines with any of said trunks, said network comprising in combination a plurality of electrically interconnected gaseous discharge tubes, arranged in successive groups between said lines and trunks, control apparatus interconnected with said tubes for applying discharge initiating conditions to tubes extending to one of said lines and means for applying discharge initiating conditions to tubes of one of said stages extending to said trunk, means responsive to discharges initiated within the tubes of one of said stages for applying discharge initiating potentials to another stage of said tubes, selecting means including one of said groups of tubes for selecting a path from said line terminal to said trunk terminal and establishing discharge through a selected tube of said stage for completing a transmission path through the tube in each of said stages from said line terminal to said trunk terminal, other control means for applying discharge sustaining voltages to said terminals for maintaining discharges through tubes providing a path from said line to said trunk including means for applying voltages to said tubes which prevent discharge through other tubes connected to said path.

10. In a telephone switching system in combination, a plurality of telephone lines, a switching network electrically interconnected with said lines for selectively interconnecting said telephone lines including a terminal individual to each of said lines, a gas conduction, tube individual to each of said terminals and electrically interconnected therewith, apparatus electrically interconnected with said terminals for selectively establishing a discharge through one of said tubes for applying a connect voltage to the terminal to which said tube is individual, means electrically interconnected with said tubes for selectively establishing a discharge through said tube in the reverse direction for applying a disconnect voltage to said terminal.

11. In a telephone switching system in combination, a plurality of telephone lines, a switching network electrically interconnected with said lines for selectively establishing telephone transmission paths to said lines comprising a selectable terminal individual to each of said lines and a plurality of electrically interconnected gas-discharge tubes arranged in a plurality of stages, means including a common impedance element electrically interconnected with said tubes for applying a discharge initiating voltage to one of said terminals through said common impedance element for selectively establishing a single path through a tube of each of a plurality of said stages, and apparatus electrically interconnected with said switching network for superimposing voice currents on said path through said tubes.

12. In a telephone switching system in combination, a plurality of telephone lines, a switching network interconnecting said lines comprising a plurality of electrically interconnected gas discharge tubes and including a selectable terminal for each of said lines electrically interconnected with said tubes, a gas conduction tube individual to each of said terminals and electrically interconnected therewith, means electrically interconnected with said gas conduction tubes for selectively establishing a discharge through one of said tubes for applying a predetermined voltage to the terminal to which said tube is individual, means including said gas discharge tubes for selecting and establishing a path between said terminals through a plurality of said gas discharge tubes in series, means for applying discharge maintaining voltages to said selectable terminals, and apparatus for superimposing upon said discharge maintaining voltages varying voltages representing communication signals for transmission over said path comprising said tubes having discharges maintained therein.

13. In a telephone switching system in combination, a plurality of telephone lines, a selectable terminal for each of said lines, a switching network interconnecting said lines comprising a plurality of electrically interconnected gas discharge tubes interconnected electrically with said selectable terminals, a gas conduction tube individual to each of said terminals and electrically interconnected therewith, means electrically interconnected with said gas conduction tubes for selectively establishing a discharge through one of said tubes for applying a connect voltage to the terminal to which said tube is individual, means including said gas discharge tubes for selecting and establishing a path between said terminals through a plurality of said gas discharge tubes in series, means for applying discharge maintaining voltages to said selectable terminals, and apparatus for superimposing upon said discharge maintaining voltages varying voltages representing communication signals for transmission over said path comprising said tubes having discharges maintained therein, other means electrically interconnected with said gas conduction tube for selectively establishing a discharge through said gas conduction tube in the reverse direction for applying a disconnect voltage to said selected terminal whereby discharges in said gas discharge tubes providing a path to said terminal are extinguished.

14. In a telephone switching system in combination, a plurality of telephone lines, a switching network interconnecting said lines comprising a selectable terminal individual to each of said lines, a plurality of gas discharge tubes arranged in groups, interconnections connecting a plurality of tubes of each group with a plurality of tubes of other groups, a resistor connected between each of said interconnections and a source of potential, means for selecting one of said selectable terminals electrically interconnected with said selectable terminals, means electrically interconnected with said terminals for applying discharge initiating potentials to said selected terminal and said network, means including said gas discharge tubes electrically interconnected with said tubes and said terminals for selecting and establishing a path between said terminals through a plurality of said gas discharge tubes in tandem, means for applying discharge maintaining voltages to said selectable terminals, and means for superimposing upon said discharge maintaining voltages varying voltages representing communication signals for transmission over said path comprising said tubes having discharges maintained therein.

15. In a telephone switching system in combination, a plurality of telephone lines, a switching network interconnected with said lines for selectively establishing any one of a plurality of different communication paths between pairs of said lines comprising in combination a selectable terminal for each of said lines electrically interconnected with said network, a plurality of gas discharge tubes included in said network and interconnected with said terminals, a plurality of interconnecting terminals arranged in a coordinate array, means for connecting a plurality of said gas discharge tubes to each of said coordinate terminals, a resistor individual to and electrically connected with each of said coordinate terminals, means for applying a bias voltage to said resistors which voltage is insufficient to initiate discharges through said gas discharge tubes, means for applying additional voltage to said selectable terminals for initiating discharges through a plurality of said tubes in series for selectively establishing one of said plurality of paths between selected ones of said lines.

References Cited in the file of this patent

UNITED STATES PATENTS

| Number | Name | Date |
| --- | --- | --- |
| 2,023,589 | Hersey | Dec. 10, 1935 |
| 2,310,452 | Meacham et al. | Feb. 9, 1943 |